United States Patent
Schmidt et al.

(10) Patent No.: US 11,281,037 B2
(45) Date of Patent: Mar. 22, 2022

(54) DISPLAY DEVICE HAVING INTEGRATED, OPTICALLY OPERATING PROXIMITY SENSOR SYSTEM

(71) Applicant: Behr-Hella Thermocontrol GmbH, Stuttgart (DE)

(72) Inventors: Rüdiger Schmidt, Paderborn (DE); Tobias Schwab, Lippstadt (DE); Tomasz Tarnowski, Erwitte (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 0 days.

(21) Appl. No.: 16/629,416

(22) PCT Filed: Jul. 12, 2018

(86) PCT No.: PCT/EP2018/068951
§ 371 (c)(1),
(2) Date: Jan. 8, 2020

(87) PCT Pub. No.: WO2019/012046
PCT Pub. Date: Jan. 17, 2019

(65) Prior Publication Data
US 2020/0150476 A1    May 14, 2020

(30) Foreign Application Priority Data

Jul. 14, 2017 (DE) .................... 10-2017-212-103.3
Sep. 18, 2017 (DE) .................... 10-2017-121-599.9

(51) Int. Cl.
*G02F 1/1333* (2006.01)
*G06F 3/042* (2006.01)

(52) U.S. Cl.
CPC ........ *G02F 1/13338* (2013.01); *G06F 3/0421* (2013.01); *G02F 2201/58* (2013.01)

(58) Field of Classification Search
CPC ...... G06F 3/0414; G06F 3/044; G06F 3/0412; G06F 2203/04106
See application file for complete search history.

(56) References Cited

U.S. PATENT DOCUMENTS

2010/0022069 A1    9/2010    Takama et al.
2011/0193818 A1    8/2011    Chen et al.
(Continued)

FOREIGN PATENT DOCUMENTS

DE    10-2016-100363 A1    7/2016
GB          2486000 A    6/2012
WO      2014-156399 A1    10/2014

OTHER PUBLICATIONS

Kratz et al., "Hoverflow: Exploring Around-Device Interaction with IR Distance Sensors" ACM, MobileHCI'09, Sep. 2009.
(Continued)

*Primary Examiner* — Christopher E Leiby
(74) *Attorney, Agent, or Firm* — Christensen Fonder Dardi; Andrew H. Auderieth; Peter S. Dardi

(57) ABSTRACT

The invention relates to a display device having an integrated, optically operating proximity sensor system (30) for detecting an object present within an observation space in front of the display device, such as a hand a finger of a hand of a person. The display device is provided with a display unit (22), which has a front side having an information-displaying display surface (20) and having an edge region (18), which adjoins said display surface and is not used for the display of information, and a rear side. The display device also has a proximity sensor system (30) having at least one transmitter (32) for emitting sensor radiation toward the observation space and having at least one receiver (34) for receiving sensor radiation reflected from the observation space. The proximity sensor system (30) is arranged in the edge region (18) of the front side or the at
(Continued)

Figure 1:
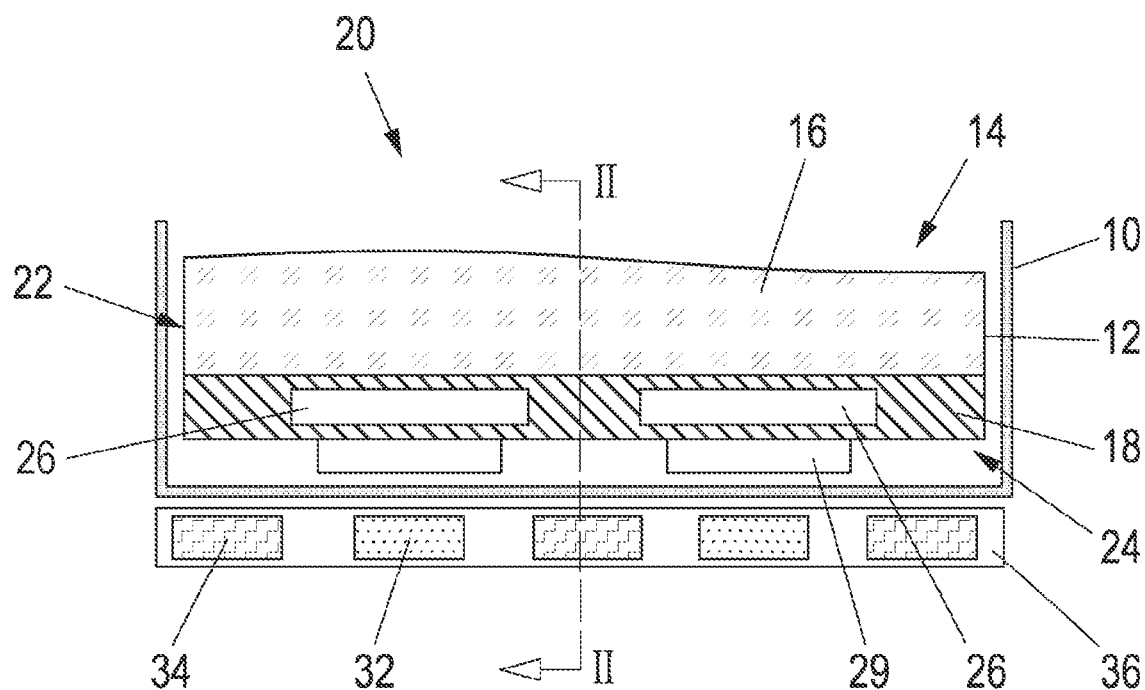

least one transmitter (32) is arranged on the rear side of the display unit (22) or facing the rear side of the display unit (22) or in the display unit (22) and the at least one receiver (34) is arranged on the front side of the display unit (22) in the edge region (18) adjoining the display surface (20).

15 Claims, 3 Drawing Sheets

(56) References Cited

U.S. PATENT DOCUMENTS

| | | | | |
|---|---|---|---|---|
| 2014/0063433 | A1* | 3/2014 | Benson | G02F 1/133308 |
| | | | | 349/155 |
| 2014/0213323 | A1* | 7/2014 | Holenarsipur | G06F 3/0304 |
| | | | | 455/566 |
| 2017/0235413 | A1* | 8/2017 | Koizumi | G06F 3/0416 |
| | | | | 345/174 |
| 2018/0260602 | A1* | 9/2018 | He | A61B 5/1495 |

OTHER PUBLICATIONS

Kratz, "Sensor-Based User Interface Concepts for Continuous, Around-Device and Gestural Interaction on Mobile Devices", Ludwig-Maximalians-Universät-München, Jun. 6, 2012. (English Abstract).
Oh et al., "Gesture Sensor for Mobile Devices", Samsung Electronics Co., Ltd., www.samsung.com, (2013).
International Search Report for Application No. PCT/EP2018/068951 dated Oct. 24, 2018.

* cited by examiner

DISPLAY DEVICE HAVING INTEGRATED, OPTICALLY OPERATING PROXIMITY SENSOR SYSTEM

CROSS REFERENCE TO RELATED APPLICATIONS

This application is a national stage application of PCT application PCT/EP2018/068951 to Schmidt et al., filed Jul. 12, 2018, which claims priority to DE application 10-2017-212-103.3 filed on Jul. 14, 2017, and DE application 10-2017-121-599.9 filed on Sep. 18, 2017, both of which are incorporated herein by reference.

The invention relates to a display device having an integrated, optically operating proximity sensor system for detecting an object present within an observation space in front of the display device, such as a hand or a finger of a hand of a person.

Display systems in a vehicle may be provided with a sensor system that detects the approximation of an operator. Such so-called proximity sensors are to a large extent operated optically on the basis of IR light which is invisible to the user. Sensors are known from practice that are mounted separately below or laterally next to the display system. Due to the highly limited installation space and displays that are becoming increasingly larger, the sensors have been placed below the cover glass of the display system in the recent past. However, they still require installation space, which has a negative effect on the appearance of display systems.

An object of the invention is to provide a display device with an integrated proximity sensor system, wherein the display device is characterized by a compact design.

Display devices comprising displays accommodated in housings and optical proximity sensor systems also accommodated in the housing are described in:

DE 10 2016 100 363 A1;
GB 2 486 000 A;
KRATZ, Sven; ROHS, Michael: Hoverflow: Exploring Around-Device Interaction with IR Distance Sensors, 11th International Conference on Human-Computer Interaction with Mobile Devices and Services, MobileHCI '09, Bonn, Germany, Sep. 15-18, 2009. Conference Proceedings, ISBN 978-1-60558-281-8. New York: ACM, 2009. Article No. 42;
KRATZ, Sven: Sensor-Based User Interface Concepts for Continuous, Around-Device and Gestural Interaction on Mobile Devices. Dissertation, Faculty of Mathematics, Informatics and Statistics, Ludwig-Maximilians-Universität München. Munich: LMU, 2012; and
O H, KyongSae; HWANG, Seok-Hee; Y O U, SeungBin et al.: Gesture Sensor for Mobile Devices—White Paper, company address, Samsung Electronics Co. Ltd. Suwon-si, Gyeonggi-do, K R: Samsung, 2013.

According to the invention, this object is achieved by proposing a display device having an integrated, optically operating proximity sensor system for detecting an object present within an observation space in front of the display device, such as a hand or a finger of a hand of a person, wherein the display device is provided with a display unit comprising a front side having an information displaying display surface, an edge region adjoining the display surface and not being used for the display of information, and a rear side, and
a proximity sensor system having at least one transmitter for emitting sensor radiation toward the observation space and having at least one receiver for receiving sensor radiation reflected from the observation space, wherein the proximity sensor system or said at least one receiver and said at least one transmitter is/are arranged on the edge region of the front side of the display unit, or the at least one transmitter is arranged below the display unit, e.g. laterally below the display unit, on the rear side of the display unit, or facing the rear side of the display unit, or in the display unit, and the at least one receiver is arranged on the edge region adjoining the display surface on the front side of the display unit, or the at least one receiver is arranged below the display unit, e.g. laterally below the display unit, on the rear side of the display unit, or facing the rear side of the display unit, or in the display unit, and the at least one transmitter is arranged in the edge region adjoining the display surface on the front side of the display unit.

In the invention presented herein, the proximity sensors or at least their optical components are integrated into the display unit itself, i.e. into the display. Thus, no additional installation space is required outside the display, whereby a slim and almost frameless design is possible.

The proposal according to the invention includes that either the entire proximity sensor system or parts of the proximity sensor system, i.e. the sensor radiation receiver, is/are integrated into or behind the edge region of the front side of the display unit, wherein the front side is defined by the information displaying display unit and an adjoining edge region. The transmitter for the sensor radiation can be arranged below the display surface, for example on the rear side of the display unit, in a backlight unit or behind the display surface. However, it is also possible that the transmitter is also arranged in the previously mentioned edge region.

In any case, it is provided according to the invention that either the entire proximity sensor system is arranged closer to the display surface of the front side of the display unit, or that at least parts of the proximity sensor system are arranged in such a way.

The display unit is typically accommodated in a housing and surrounded by the front wall of the housing or a housing frame merging into the side walls of the housing. Conventionally, the proximity sensor system is accommodated in the housing frame or in the region of the front wall of the housing adjoining the display, i.e. arranged outside the actual display. The invention differs from this concepts in that the proximity sensor system is integrated into the display at least in parts. If the display according to the invention was not surrounded by a housing, the proximity sensor system would entirely or at least partially still be part of the display and would be integrated into the display to this respect, namely into the edge region or below the edge region on a display panel of the display comprising the image and symbol generating optical elements. It is decisive for the invention that the entire proximity sensor system or at least parts thereof is/are part of the display and is/are not realized as separate elements in the surrounding area of the display.

In a further advantageous embodiment of the invention, it is provided that the display unit comprises a display panel having the display surface and the edge region. Conventionally, display panels are configured as so-called TFT panels which define a display surface that is defined by pixels or the surface occupied by pixels. A TFT panel further comprises a protrusion protruding laterally beyond said display surface, wherein driver electronics for pixels or for the entire display unit is arranged in the protrusion. The driver electronics is then usually electrically connected by flex circuit boards. According to the invention, the proximity sensor system or at least parts thereof can now be arranged on said flex circuit boards but can also be arranged directly on the display panel. It applies for both cases that the proximity sensor system or parts thereof are integrated on and/or into the edge region around the display surface of the display that is not used for the display of information.

According to the invention, the protrusion region of a TFT panel can now be used to accommodate the proximity sensor system or at least parts of the proximity sensor system therein, namely the receiver(s), according to the invention.

For this purpose, it is for example provided that
  the display unit comprises a display panel and a color filter layer arranged above the display panel and defining the display surface,
  the display panel protrudes from at least one edge portion beyond the color filter layer, and that the protrusion forms the edge region laterally adjoining the display surface, and
  that
    the at least one receiver is arranged in and/or on and/or below the protrusion of the display panel, or
    the at least one transmitter and the at least on receiver of the proximity sensor system are arranged in and/or on and/or below the protrusion of the display panel.

In a further advantageous embodiment of the invention, a backlight unit can be provided to backlight the display unit, wherein the at least one transmitter is arranged in and/or on and/or below the backlight unit.

The sensor radiation is preferably invisible light in the IR region, i.e. IR radiation.

It is expedient if the display unit is an LCD display unit.

In a further expedient embodiment of the invention, it may be provided that the at least one transmitter is provided with an optical system for aligning its region sensitive to radiation toward the observation space in front of the display surface. The optical system can be a light deflection foil, a Fresnel lens or the like.

In addition to the proximity sensor system for detecting an object arranged in front of the display unit, in particular also for detecting the distance of the object arranged in front of the display unit, the display device according to the invention may be provided with a non-optically operating touch sensor system, such as a capacitively or resistively or ultrasound-based operating touch sensor system.

The non-optically operating touch sensor system is particularly configured as a touch panel that is positioned on the front side of the display unit and/or on the color filter layer and/or behind a cover glass arranged in front of the display unit and/or in front of the color filter layer.

Finally, it is also possible in a further embodiment of the invention that upon arrangement of the at least one transmitter and the at least one receiver on the edge region of the front side, both are sealed from each other in order to prevent a crosstalk.

In the aforementioned, the proximity sensor system is characterized as comprising at least one transmitter and at least one receiver. According to a variant of the invention, the proximity sensor system comprises a receiver matrix, e.g. an image sensor, as a receiver that is arranged on the edge region of the front side and provided for 2D image capturing. A receiver can particularly also be provided for 3D capturing of the observation space. Such a proximity sensor system (with sensor radiation) is sometimes also construed as a TOF sensor (Time of Flight) and can be configured as an individual receiver and as a receiver matrix.

Figure 2:
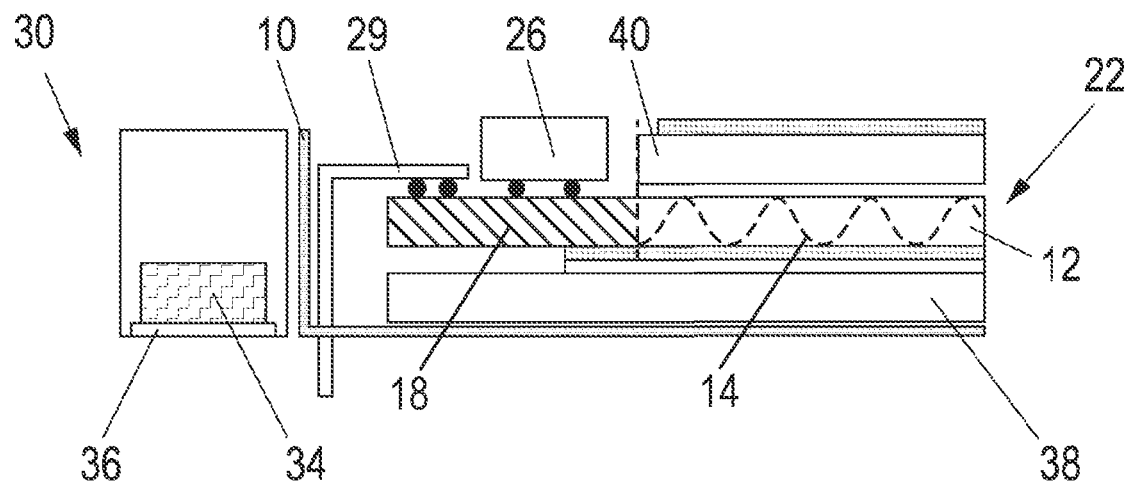
Figure 3:
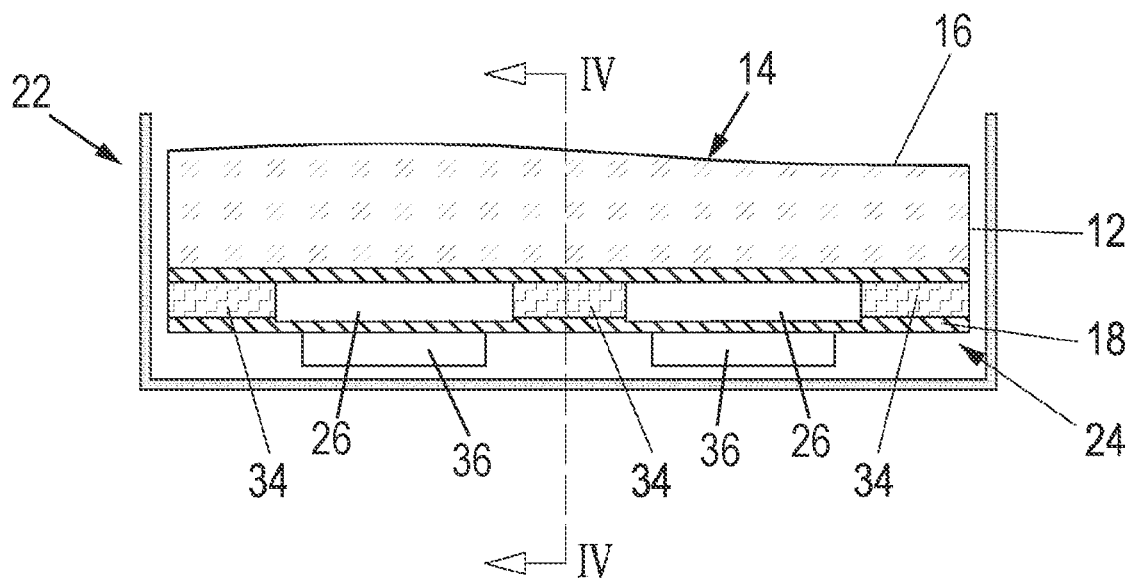
Figure 4:
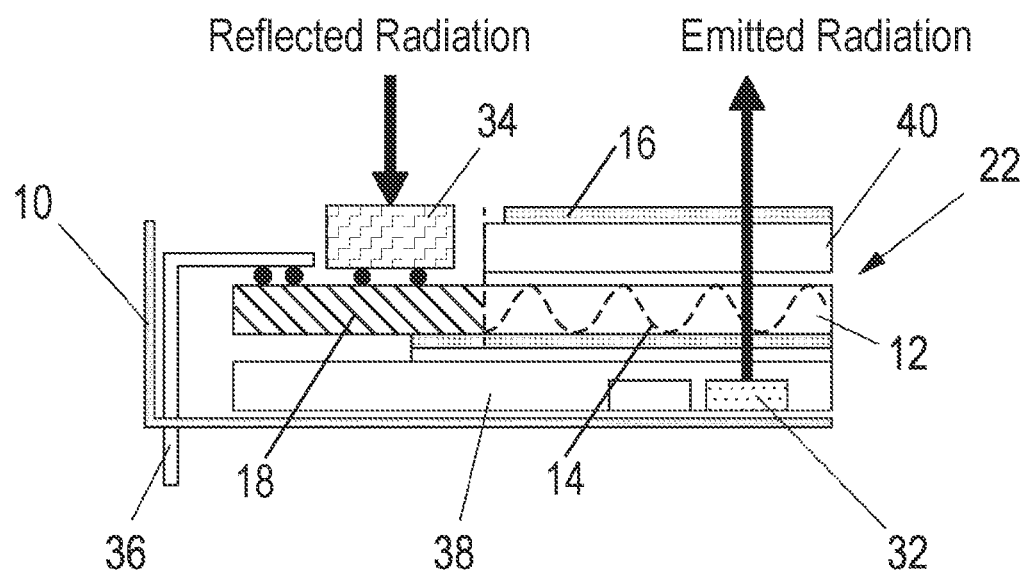
Figure 5:
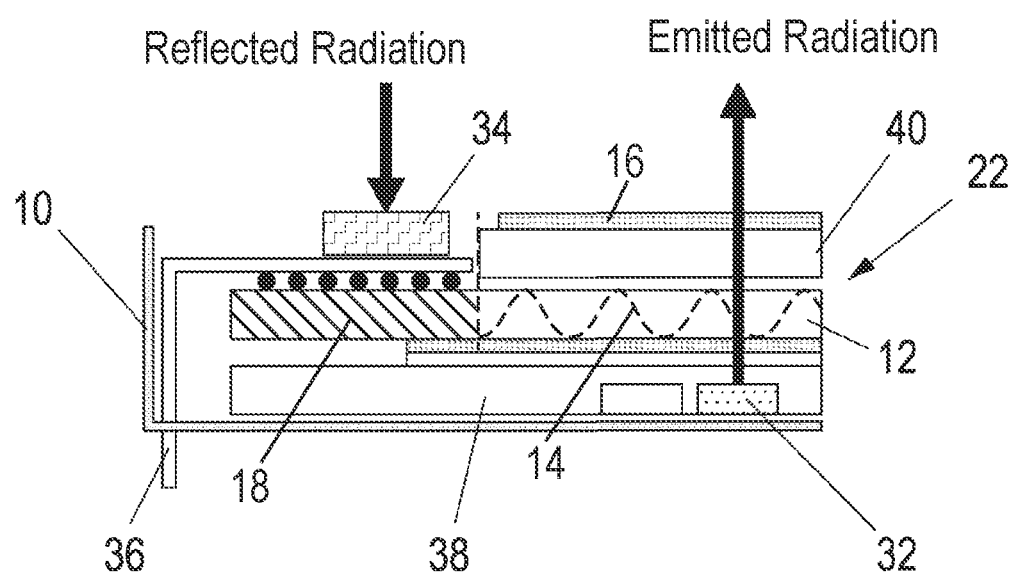

In the following, two exemplary embodiments of the invention are explained in more detail with reference to the drawing. The individual figures show:

FIG. 1 a plan view on a TFT panel of a display unit comprising a proximity sensor system arranged on the edge of the display unit and outside the display unit, as known from prior art, FIG. 2 a sectional view along line II-II of FIG. 1, FIG. 3 a plan view on a display device according to the invention, where the proximity sensor system is entirely accommodated on an edge region defined by the TFT panel of the display unit, FIG. 4 a sectional view along line IV-IV of FIG. 3, and FIG. 5 an alternative display unit according to the invention in sectional view.

FIGS. 1 and 2 show solutions currently belonging to prior art for display devices having a proximity sensor system for detecting the approximation of objects to the display unit of the display device. The display device is spatially limited by housing 10 and comprises a TFT panel 12 on whose display surface 14 a polarizer 16 with a color plate underneath is arranged. Edge region 18 of TFT panel 12 is blank, i.e. it does not comprise pixels and thus does not belong to display surface 20 of display unit 22.

In edge region 18, which is so to speak defined by a protrusion 24 of the TFT panel 12, driver circuits 26 for the operation of display unit 22 are disposed, for example. TFT panel 12 is electrically contacted by flex circuit boards (indicated by 29).

As can be seen in FIGS. 1 and 2, a proximity sensor system 30 with at least one transmitter 32 and at least one receiver 34 is disposed next to housing 10 of the display device. Said proximity sensor system 30 is arranged on an additional circuit board 36.

The additional installation space for the accommodation of proximity sensor system 30, which according to prior art can of course also be placed as a unit separated from display unit 22 next to display 22 within the device housing in which display unit 22 is arranged, sometimes causes problems. Therefore, it is proposed according to the invention to accommodate at least a part of proximity sensor system 30, namely for example the receiver(s) 34, in protrusion 24 of TFT panel 12; on said edge region 18 of TFT panel 12, which is provided by protrusion 24, the drivers 28 are disposed and therebetween the receivers 34.

In a variant of the invention, at least one transmitter 32 is accommodated in addition to receiver 34 on edge region 18 of TFT panel 12 provided by protrusion 24, wherein the drivers 28 and therebetween the receivers 34 and the transmitters 32 are disposed on edge region 18.

This can be seen in FIGS. 3 and 4. FIG. 4 shows that the transmitter(s) 32 is/are for example arranged in backlight unit 38 of display unit 22. It can further be seen in FIG. 4 that a color filter layer (color plates) or a color filter 40 is arranged on TFT panel 12. Backlight unit 38 as well as TFT panel 12 with color filter 40 and the polarizers 16 are elements of display devices belonging to prior art.

If the proximity sensor system is based on the basis of a TOF measurement of sensor radiation, the transmitter(s) 32 as well as the receiver(s) 34 are arranged on protrusion 24 of TFT panel 12. However, the transmitters 32 can also be part of backlight unit 38.

FIG. 5 shows a further exemplary embodiment of the invention as an alternative to the one according to FIGS. 3 and 4. As can be seen, in this exemplary embodiment either the entire proximity sensor system 30 or a part thereof is disposed on the flexible circuit board 36 whose contact fields are for their part electrically connected to TFT panel 12 by means of conductive adhesive.

A plurality of transmitters 32 or receivers 34 of proximity sensor system 30 can now be placed on circuit board 36 which is arranged along the edge of the display. (In the exemplary embodiment, the receivers 34 are placed on the flexible circuit board 36, while the transmitters 32 are arranged below the display.) In this respect, an electrical connection of proximity sensor system 30 or of parts of proximity sensor system 30 to the flexible circuit board 36 is also to be construed as an arrangement of the proximity sensor system or as an arrangement of parts thereof on the edge region of the front side of display unit 22.

As an alternative to the above-described display device, it may also be provided that the transmitters of the proximity sensor system are arranged in the backlight, i.e. in der backlight unit of the display, in order to then, however, arrange the receivers of the proximity sensor system on the edge region of the display unit. This may be advantageous due to reasons of saving space or due to a limited space.

The advantageous of the inventive concept are as follows:
- no additional installation space for the proximity sensor system, since the latter is part of the display unit,
- slim design of the display unit and the display device realizable with a slim display frame,
- no additional light conductors required if the transmitters are part of the lighting unit in order to ensure an approximation to the display unit or the display surface.

The integration of the proximity sensor system or at least of parts thereof on the protrusion region of the TFT panel makes it possible to use known and process-reliable electronic contacting and to realize the electrical connection by means of existing flex conductors. Thus, the receivers (sensors) are not disposed below the color filter and also not below the polarizer(s), whereby the radiation is not damped. The radiation received by the receivers is thus stronger and the sensitivity and the signal strength are improved without additional measures being required.

Components with sensors consisting of transmitters and receivers can be used for the proximity sensor system. Such special complex sensors can also be mounted and contacted, as described above. Thus, for example sensors measuring the propagation time (Time-of-Flight Principle) or array sensors (i.e. image sensors), optionally with microlenses in the form of foils, Fresnel lenses etc., can be used.

The invention has been described above by means of examples in which the proximity sensor system is either entirely, i.e. transmitters and receivers (optionally with control), arranged on the edge region of the display, or in which at least one of or all of the receivers is/are arranged on the edge region of the display or one of or all of the transmitters is/are arranged below the display (or below the display surface of the display and thus in the display but not in its edge region). The last described construction can be provided according to the invention but also when interchanging transmitter and receiver such that one of or all of the transmitters is/are arranged on the edge region of the display, and that one of or all of the receivers is/are arranged below the display or below the display surface of the display (optionally below the display surface of the displace but not in its edge region).

LIST OF REFERENCE NUMERALS 10 housing
12 TFT panel
14 display surface
16 polarizer
18 edge region
20 display surface
22 display unit
24 protrusion
26 driver circuits
28 driver
29 flex conductor
30 proximity sensor system
32 transmitter
34 receiver
36 circuit board
38 backlight unit
40 color filter

The invention claimed is:

1. A display device having an integrated, optically operating proximity sensor system for detecting an object present within an observation space in front of the display device comprising:
   a display unit comprising a front side having an information display surface and a display panel having a display surface and an edge region laterally adjoining the information display surface and not being used for the display of information, wherein a color filter layer is arranged above the display panel and defines the display surface, wherein the display panel protrudes from at least one edge portion beyond the color filter layer to form the edge region and
   a proximity sensor system having at least one transmitter for emitting sensor radiation toward an observation space in front of the display device and having at least one receiver for receiving sensor radiation reflected from the observation space,
   wherein the at least one transmitter is arranged below the display panel and the at least one receiver is arranged on the edge region on the front side of the display unit, wherein the term below is referenced with the front side of the display unit being above the display unit.

2. The display device according to claim 1, wherein the display panel is a TFT panel.

3. The display device according to claim 1, further comprising a backlight unit for backlighting the display unit, wherein the at least one transmitter is arranged in the backlight unit.

4. The display device according to claim 1, wherein the sensor radiation is IR radiation.

5. The display device according to claim 1, wherein the display unit is an LCD matrix display unit.

6. The display device according to claim 1, wherein the at least one transmitter and/or the at least one receiver is provided with an optical system for aligning the sensor radiation toward the observation space.

7. The display device according to claim 1, further comprising a non-optically operating touch sensor system.

8. The display device according to claim 7, wherein the touch sensor system comprises a touch panel which is positioned on the front side of the display unit and/or on the color filter layer and/or behind a cover glass arranged in front of the display unit and/or in front of the color filter layer.

9. The display device according to claim 1, wherein the at least one receiver comprises a receiver matrix, with or without an optical system, that is arranged in the edge region of the front side of the display unit and provides for 2D or 3D image capturing of the observation space.

10. The display device according to claim 9, wherein the proximity sensor system comprises a transmitter that can be activated when the ambient light for 2D or 3D image capturing of the observation space is insufficient.

11. The display device according to claim 1, wherein the display panel comprises a plurality of pixels.

12. The display device according to claim 9, characterized in that the receiver matrix is an image sensor.

13. The display device according to claim 1, wherein the at least one transmitter is arranged on the rear side of the display unit or facing the rear side of the display unit.

14. The display device according to claim 7, wherein the non-optically operating touch sensor system comprises a capacitively, a resistively, or an ultrasound-based operating touch sensor system.

15. The display device according to claim 1, further comprising a circuit board having a section on the edge region on the front side of the display unit, wherein the at least one receiver is arranged on an upper surface of the section.

\* \* \* \* \*